United States Patent [19]

Braun et al.

[11] 4,334,825
[45] Jun. 15, 1982

[54] ELASTOMERIC DAMPING DEVICE ESPECIALLY FOR THE NECK OF HELICOPTER WING BLADES

[75] Inventors: Dieter Braun, Oberpframmern; Wolfgang Buchs, Valley; Andreas Kirchner, Oedenstockach, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 229,538

[22] Filed: Jan. 29, 1981

[30] Foreign Application Priority Data

Feb. 7, 1980 [DE] Fed. Rep. of Germany ....... 3004451

[51] Int. Cl.³ .............................................. B64C 27/38
[52] U.S. Cl. ................................. 416/134 A; 416/141
[58] Field of Search .......... 416/134 A, 230 A, 140 A, 416/141, 138 A

[56] References Cited

U.S. PATENT DOCUMENTS

| | | | |
|---|---|---|---|
| 3,874,815 | 4/1975 | Baskin | 416/141 X |
| 3,999,886 | 12/1976 | Ormiston et al. | 416/138 A X |
| 4,037,988 | 7/1977 | Laird | 416/134 A X |
| 4,093,400 | 6/1978 | Rybicki | 416/141 |
| 4,097,193 | 6/1978 | Brünsch et al. | 416/224 |
| 4,120,610 | 10/1978 | Braswell et al. | 416/230 A X |
| 4,252,503 | 2/1981 | Wackerle et al. | 416/141 |
| 4,273,511 | 6/1981 | Mouille et al. | 416/141 X |
| 4,299,538 | 11/1981 | Ferris et al. | 416/141 X |

FOREIGN PATENT DOCUMENTS

| | | | |
|---|---|---|---|
| 2806119 | 8/1979 | Fed. Rep. of Germany | 416/138 A |
| 2823389 | 12/1979 | Fed. Rep. of Germany | 416/134 A |

OTHER PUBLICATIONS

United States Patent Application Ser. No. 015,311, filed on Feb. 26, 1979, Inventor: Peter-Martin Wackerle et al.

*Primary Examiner*—Everette A. Powell, Jr.
*Attorney, Agent, or Firm*—W. G. Fasse; D. H. Kane, Jr.

[57] ABSTRACT

The neck of a hingeless helicopter rotor wing blade is provided with a damping device effective to dampen lead-lag movements of the rotor wing blade. For this purpose the damping device comprises at least two stiff plates secured to opposite sides of the blade neck by a plurality of elastomeric members glued or bonded to the respective stiff plate and to the blade neck at spaced intervals. The difference of deformation between the stiff plates and the blade neck causes a deformation of the individual members in directions substantially across the longitudinal blade direction (in lead-lag plane). The spacings between adjacent members are located where the damping action is inherently low.

3 Claims, 1 Drawing Figure

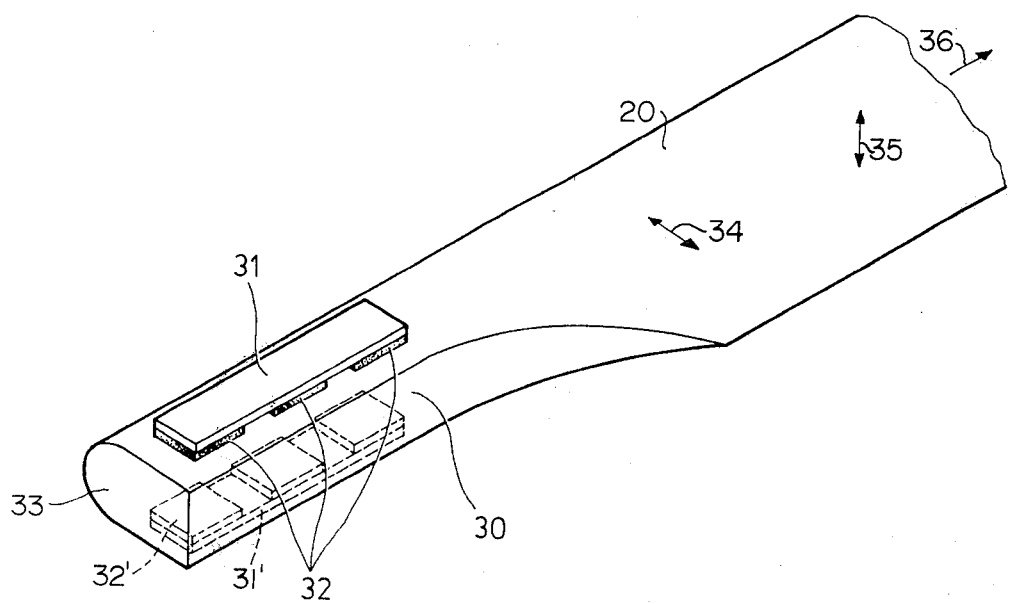

ELASTOMERIC DAMPING DEVICE ESPCIALLY FOR THE NECK OF HELICOPTER WING BLADES

CROSS-REFERENCE TO RELATED APPLICATION

The present application correspond to German Patent Application No. P 3,004,451.0, filed in the Federal Republic of Germany on Feb. 7, 1980, the priority of said German filing date is hereby claimed.

BACKGROUND OF THE INVENTION

The present invention relates to an elastomeric damping device especially for the neck of helicopter wing blades. More specifically, the invention relates to a damping device for a rotor blade capable of vibrations having a blade neck which is relatively flexible or soft against bending in the lead-lag direction of the blade.

U.S. Pat. No. 4,097,193 assigned to the same assignee relates to an elastomeric damping arrangement constructed to provide a highly efficient damping of the vibrations of a vibration prone member, such as an airfoil, especially a helicopter rotor blade. The prior art damping arrangement is applied directly on or to the vibration prone structural member in the region of dynamic deformations as an integral component of the structural member. At least one damping layer is covered by a protecting outer layer which merges smoothly into the surface of the vibration prone member. The damping layer is made of a visco-elastic material having a high internal damping action. The protecting cover layer is made of high strength material having a high rigidity in the direction of the occurring damping force. Such structure leaves room for improvement, especially with regard to the efficiency of the damping action.

U.S. patent application Ser. No. 015,311, filed Feb. 26, 1979, now in condition for allowance and also assigned to the same assignee as the present application, relates to a rotor blade especially for rotary wing aircraft in which the rotor blade has a neck connecting the blade proper to a rotor head at the blade root. The neck section is flexible against bending in the lead-lag direction and in the flapping direction. A carrier member is located alongside or inside the neck section, but spaced from the neck section. The carrier member is resistant against bending at least in the lead-lag direction or in the flapping direction. The carrier member is rigidly connected at its one end to the blade proper. A layer of a damping material is operatively interposed between the carrier member and the neck section, preferably at the blade root end of the neck section, whereby blade vibrations preferably in the lead-lag direction are damped and substantially prevented from entering into the rotor head. Such a structure also leaves room for improvement, especially with regard to achieving a more effective damping action with simpler means.

OBJECTS OF THE INVENTION

In view of the above it is the aim of the invention to achieve the following objects singly or in combination:

to provide a lead-lag damping device for a rotor blade, especially a helicopter rotor blade, which is simple and more efficient in its damping action; and to arrange an intermediate damping layer in such a manner that its damping action is the result of shearing deformations substantially in a direction extending across the longitudinal blade axis.

SUMMARY OF THE INVENTION

According to the invention there is provided a damping device especially for helicopter rotor blades which comprises a bending stiff plate secured to opposite sides (suction and pressure sides) of the blade neck and extending in the direction of the longitudinal blade axis, or rather, in parallel thereto. These plates are stiff against bending in a direction in which the damping force is to be applied. Each plate is secured to the blade neck by a plurality of intermediate members of visco-elastic material. The bonding between the visco-elastic damping material and the bending stiff plate on the one hand and between the visco-elastic damping material and the blade neck on the other hand may be accomplished by a conventional suitable adhesive or by vulcanization or the like. The connecting members of visco-elastic material are spaced from one another in the direction of the longitudinal blade axis.

Thus, the bending stiff plate is stiff relative to bending moments effective in the plane of the lead-lag movements of the blade, on the other hand the intermediate members of visco-elastic damping material are deformable in this direction so that their damping effect is caused by their shearing deformation substantially in a direction extending across or perpendicularly to the longitudinal blade axis. In other words, the deformation of the intermediate members of visco-elastic damping material takes place in a plane extending in parallel to the plane in which the lead-lag vibrations or movements take place. It has been found that the shearing deformations in this just mentioned plane are substantially larger than the shearing deformations taking place in prior art structures in planes extending in parallel to the longitudinal blade axis and perpendicular to the lead-lag plane due to tension loads effective parallel to the longitudinal blade axis direction.

Another advantage of the invention is seen in that by spacing the individual damping members from one another the zones of small damping efficiency which are present in prior art structures have been eliminated.

BRIEF FIGURE DESCRIPTION

In order that the invention may be clearly understood, it will now be described, by way of example, with reference to the accompanying drawings, wherein the single FIGURE shows a perspective view of a blade neck section of a helicopter rotor blade equipped with a damping device according to the invention.

DETAILED DESCRIPTION OF A PREFERRED EXAMPLE EMBODIMENT AND OF THE BEST MODE OF THE INVENTION

The single FIGURE shows the radially inner end of the rotary wing blade 20 having a blade neck 30 and a blade root 33. The blade neck 30 is flexible or bendable in the lead-lag direction indicated by the arrow 34 and in the flapping direction indicated by the arrow 35. In order to make the neck 30 flexible in the just mentioned directions, it may be constructed of glass fiber rovings extending substantially in the direction of the longitudinal blade axis 36 and embedded in a synthetic resin matrix as is well known in the art.

Since the blade neck 30 is flexible as described, it may be connected at its root 33 to a rotor head in a hingeless manner. This may, for example, be accomplished by conventional hardware elements secured to the blade neck, but not shown since they are not part of the invention.

In order to avoid excessive amplitudes of the rotor blade lead-lag movements in such hingeless rotors, there is provided according to the invention a damping device comprising two longitudinal plates 31 and 31' which are stiff against bending especially in the lead-lag direction 34. The bending stiff plates 31, 31' extend in parallel to the longitudinal blade axis 36 and may be made of fibers impregnated with a synthetic resin.

Each plate 31, 31' is secured to the blade neck 30 by means of a plurality of damping members 32, 32' spaced from one another and made of a visco-elastic material such as silicone or polyurethane. It has been found that spacing the members 32, 32' in the longitudinal direction from one another eliminates zones of inefficient damping. The damping members 32, 32' are, for example, connected with the blade neck and with the respective plate 31, 31' by means of a suitable adhesive or by vulcanizing.

This damping construction including a bending stiff plate on the blade pressure side and on the blade suction side of the blade neck 30 utilizes the fact that a lead-lag bending of the blade neck 30 the respective plate 31, 31' causes a shearing deformation of the individual damping members 32, 32' forming the intermediate layer between the blade neck and the respective plate. This shearing deformation takes place in the direction extending across the longitudinal direction 36, whereby a relatively large damping efficiency is accomplished as compared to a damping in which the deformation takes place in the longitudinal direction 36.

Although the invention has been described with reference to a specific example embodiment, it will be appreciated, that it is intended to cover all modifications and equivalents within the scope of the appended claims.

What is claimed is:

1. In a hingeless rotor wing blade, especially for helicopters, including a blade, a blade root and a blade neck operatively interconnecting the blade to the blade root, said blade neck being flexible at least in the lead-lag direction, and damping means operatively secured to said blade neck in the region subject to the largest dynamic deformations resulting from blade movements, the improvement wherein said damping means comprise at least two longitudinal plates which are stiff against bending in the direction in which a damping force is to be effective, and intermediate connecting members made of a visco-elastic material having a high damping capacity operatively connecting the respective plate to said blade neck at the suction side and at the pressure side of the blade neck so that said plates extend in parallel to the longitudinal blade axis, said intermediate connecting members being spaced from each other in the direction of the longitudinal blade axis and forming the sole connecting means between the plates and the blade neck.

2. The hingeless rotor of claim 1, wherein at least three intermediate connecting members are arranged on the suction side of the blade neck and at least three intermediate connecting members are arranged on the pressure side of the blade neck.

3. The hingeless rotor of claim 1, wherein said intermediate connecting members are equally spaced from one another in the direction of the longitudinal blade axis.

* * * * *